(12) United States Patent
Hu et al.

(10) Patent No.: US 7,802,052 B2
(45) Date of Patent: Sep. 21, 2010

(54) METHODS FOR PROCESSING MULTI-SOURCE DATA

(75) Inventors: Yong Hu, Taipei (TW); De-Jian Li, Taipei (TW); Gavin Gao, Taipei (TW)

(73) Assignee: Via Technologies, Inc., Taipei (TW)

( * ) Notice: Subject to any disclaimer, the term of this patent is extended or adjusted under 35 U.S.C. 154(b) by 621 days.

(21) Appl. No.: 11/853,043

(22) Filed: Sep. 11, 2007

(65) Prior Publication Data

US 2008/0147600 A1 Jun. 19, 2008

(30) Foreign Application Priority Data

Dec. 15, 2006 (TW) ............................... 95147051 A

(51) Int. Cl.
*G06F 12/08* (2006.01)
(52) U.S. Cl. ...................................... 711/114; 711/113
(58) Field of Classification Search ........................ None
See application file for complete search history.

(56) References Cited

U.S. PATENT DOCUMENTS

| | | | | |
|---|---|---|---|---|
| 5,890,207 A | * | 3/1999 | Sne et al. ..................... 711/113 |
| 6,145,017 A | * | 11/2000 | Ghaffari ......................... 710/5 |
| 6,279,050 B1 | * | 8/2001 | Chilton et al. ................. 710/20 |
| 6,789,143 B2 | * | 9/2004 | Craddock et al. ............. 710/54 |
| 6,807,590 B1 | * | 10/2004 | Carlson et al. ................ 710/57 |
| 7,523,291 B2 | * | 4/2009 | Holder et al. ................ 711/210 |
| 2006/0085593 A1 | * | 4/2006 | Lubbers et al. ............. 711/114 |

* cited by examiner

*Primary Examiner*—Wilson Lee
*Assistant Examiner*—Belinda Xue
(74) *Attorney, Agent, or Firm*—Thomas, Kayden, Horstemeyer & Risley

(57) ABSTRACT

Methods for processing multi-source data. It is determined whether any data exists at a position pointed by a first pointer corresponding to a first data source in a queue. If so, an overlapped portion of data read from the first data source and the data pointed by the first pointer in the queue is processed with the data in the queue, and stored to the queue from the position pointed by the first pointer. The first pointer re-points to a position subsequent to the processed data in the queue. A non-overlapped portion of the data read from the first data source and the data pointed by the first pointer in the queue is stored to the queue from the position pointed by the first pointer. If the data in the queue is processed with data from each of the data sources, the processed data is output to a data processing system for further processing.

16 Claims, 9 Drawing Sheets

METHODS FOR PROCESSING MULTI-SOURCE DATA

BACKGROUND OF THE INVENTION

1. Field of the Invention

The disclosure relates generally to data processing, and, more particularly to methods for processing multi-source data.

2. Description of the Related Art

Employment of disk arrays can improve access speed to disks and prevent data lost due to disk failure. Disk arrays integrate several disks into an array, used as a single disk. Data in a disk array is stripped and stored in different disks. A RAID (Redundant Arrays of Independent Disks) controller can access data from physical memory devices (disks) in the disk array, and perform operations thereto. In the disk array, the physical address where each data strip to be stored is allocated according to the space of respective physical memory devices. During data access, related disks in the disk array can work simultaneously, reducing the data access time.

The technique for disk array is referred to as RAID, and configured in levels RAID 0 to RAID 5. In some RAID levels, in addition to data strips stored in different disks, parity information corresponding to data can be further calculated and stored in a specific disk of the disk array. If a disk storing one of the data strips fails, the data strip in the failed disk can be recovered according to the other data strips and the parity information.

FIG. 7 is a schematic diagram illustrating a conventional RAID 5 architecture. As shown in FIG. 7, disks D1~D4 are selected as a group to create a RAID 5 architecture, in which data strips A1, A2 and A3 of a specific column A are stored in disks D1, D2 and D3, respectively. Additionally, parity information AP corresponding to data is stored in column A of disk D4. The parity information AP is the algorithmic result of the data strips A1, A2 and A3. Similarly, two data strips and the parity information AP can be used to calculate the other data strip. For example, data strip A3 can be calculated according to the parity information AP and data strips A1 and A2. Since a large amount of data calculations is in RAID applications, more efficient data processing methods are required.

In order to make CPU (Central Processing Unit) or memory controller more efficient, data will be requested from one address boundary to another. If the starting address or ending address of the required data is not at the address boundary, more data than required is requested.

Conventional data processing systems and methods will discard the unnecessary data. FIG. 1 shows an example of a data request, where the address boundary is 16 DWs (Double Words), and a data block of 16 DWs can be retrieved by a system at a time. As shown in FIG. 1, the starting address of a data source (SRC) is at 0x20, which is not at the address boundary. Conventionally, the first data request is from 0x00 to 0x80. As described, a data block of 16 DWs is retrieved at a time. Actually, the required 16 DWs data is from 0x20 to 0x60. The data from 0x00 to 0x20 and from 0x60 to 0x80 is not required and discarded. Similarly, the second data request is from 0x40 to 0xc0. Actually, the required 16 DWs data is from 0x60 to 0xa0, and other data is discarded. Other data requests are similar thereto. The system will retrieve and discard unnecessary data for each data request if the starting address is not at the address boundary. In subsequent data requests, some data may be repeatedly retrieved and discarded. Consequently, conventional data processing mechanisms are inefficient if the starting address or ending address of a data source is not at the address boundary.

BRIEF SUMMARY OF THE INVENTION

Methods for processing multi-source data are provided.

In an embodiment of a method for processing multi-source data for use in a data processing system receiving data from multiple data sources, data is read from a first data source. It is determined whether any data exists at a position pointed by a first pointer corresponding to the first data source in a queue. If so, an overlapped portion of the data read from the first data source and the data pointed by the first pointer in the queue is processed, where the overlapped portion begins from the position pointed by the first pointer. The processed data is stored to the queue from the position pointed by the first pointer, and the first pointer re-points to a position subsequent to the processed data in the queue. Thereafter, a non-overlapped portion of the data read from the first data source and the data pointed by the first pointer in the queue is stored to the queue from the position pointed by the first pointer, and the first pointer re-points to a position subsequent to the non-overlapped portion in the queue. If the data in the queue is processed with data from each of the data sources, the processed data is output to the data processing system for further processing.

In an embodiment of a method for processing multi-source data for use in a data processing system receiving data from multiple data sources, data is read from respective data sources. It is determined whether the data is the first time to be read from each data source. If so, a pointer corresponding to each data source points to a starting address of a first part in a queue. If not, the pointer corresponding to each data source points to a position of a specific part in the queue according to the size of the data from each data source. The data from respective data source is stored to the queue according to the position pointed by respective pointer. The data from respective data sources in the queue is processed, and the processed data is output to the data processing system for further processing.

Methods for processing multi-source data may take the form of program codes embodied in a tangible media. When the program codes are loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods for processing multi-source data are provided.

Figure 1:
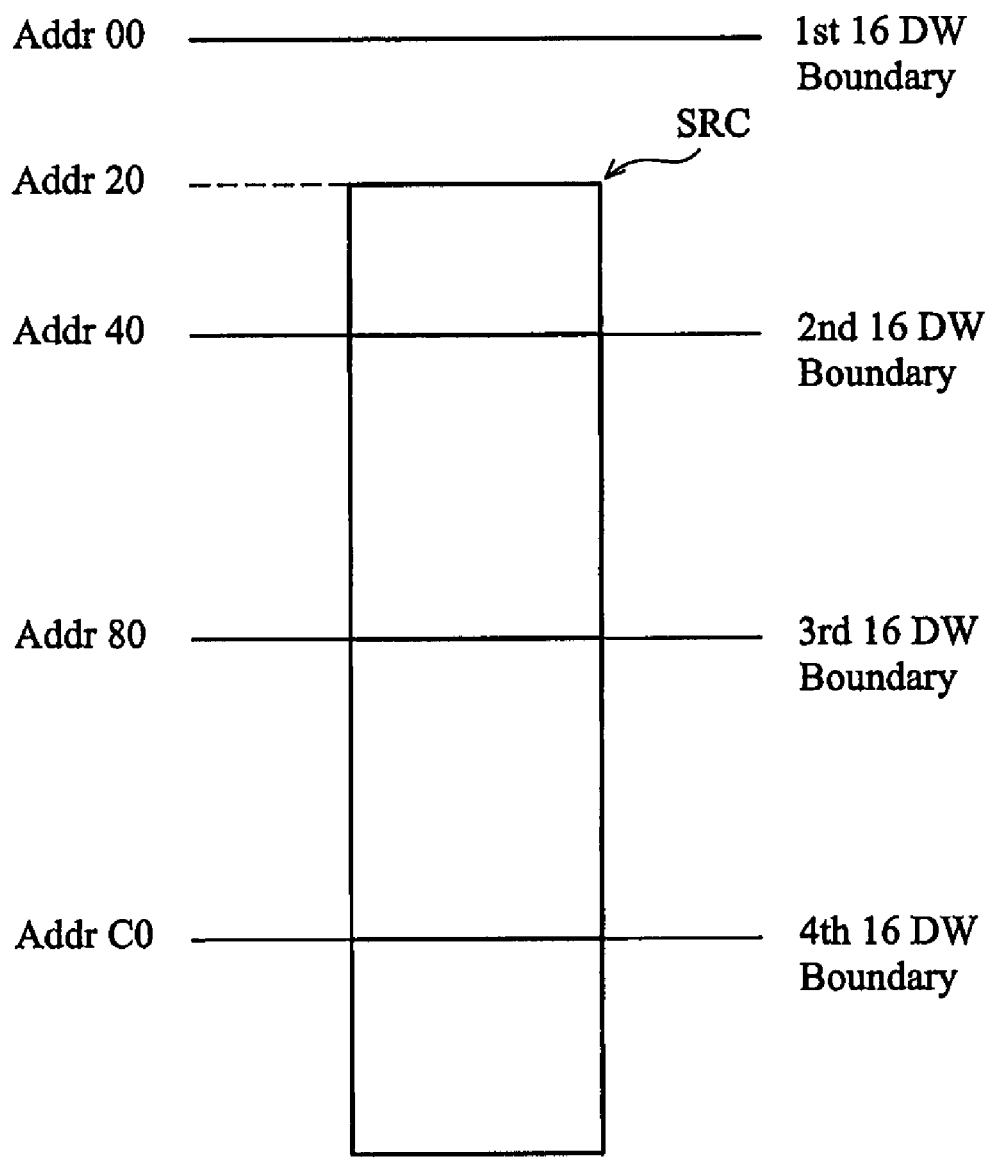
FIG. 1 shows an example of a data request.
Figure 2:
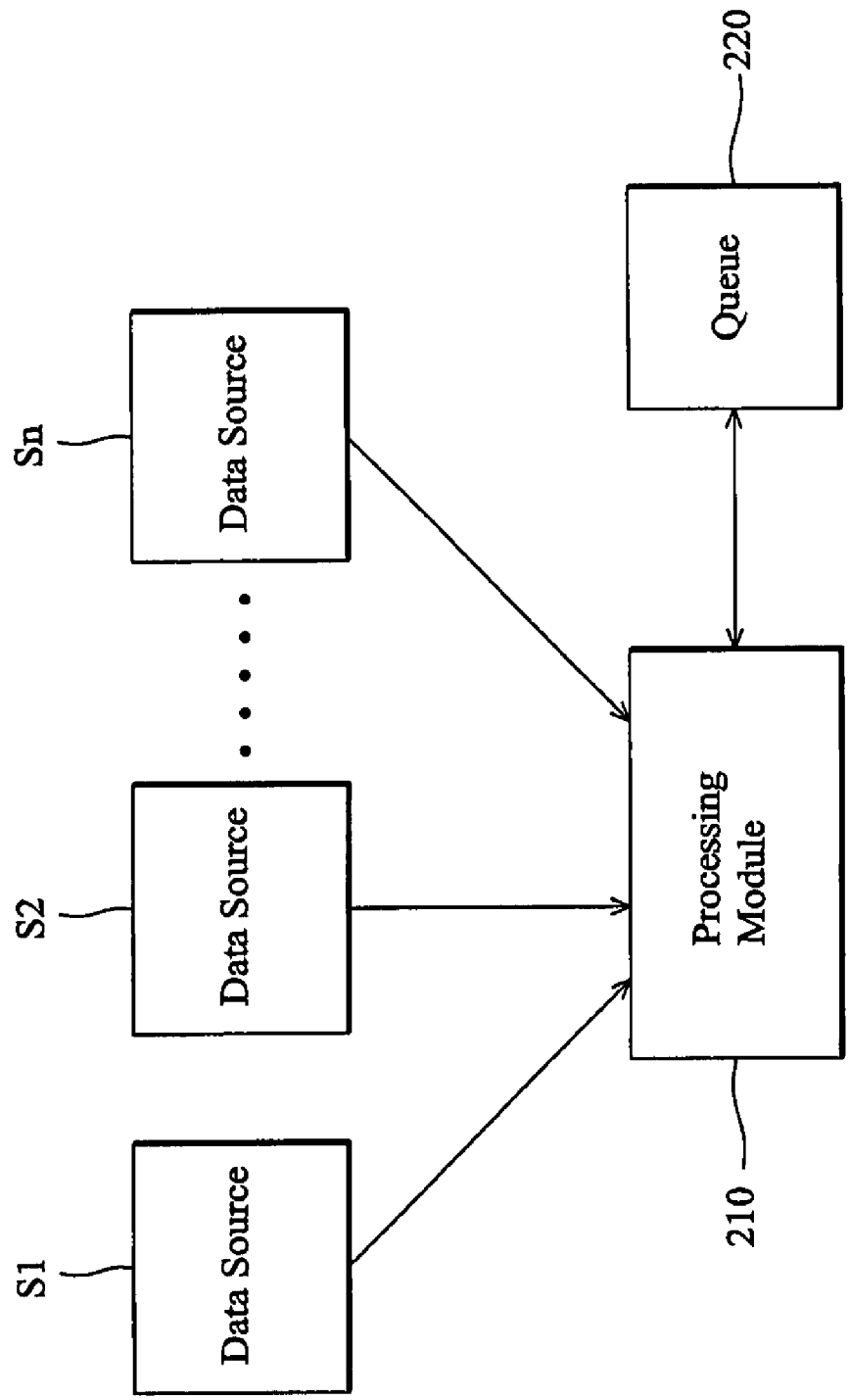
FIG. 2 is a schematic diagram illustrating an embodiment of a system for processing multi-source data.

FIG. 2 is a schematic diagram illustrating an embodiment of a system for processing multi-source data. The system 200 comprises a processing module 210 such as a CPU or memory controller, and a queue 220. The processing module 210 can process a data block of a specific size at a time. The processing module 210 reads data from several data sources (S1, S2, . . . , Sn), and stores the processed data to the queue 220. It is understood that the data in the queue 220 is called intermediate data if the data has not been processed with data from all of the data sources. The data in the queue 220 is called complete data if the data has been processed with data from all of the data sources, and the complete data can be output for further processing.

Figure 3:
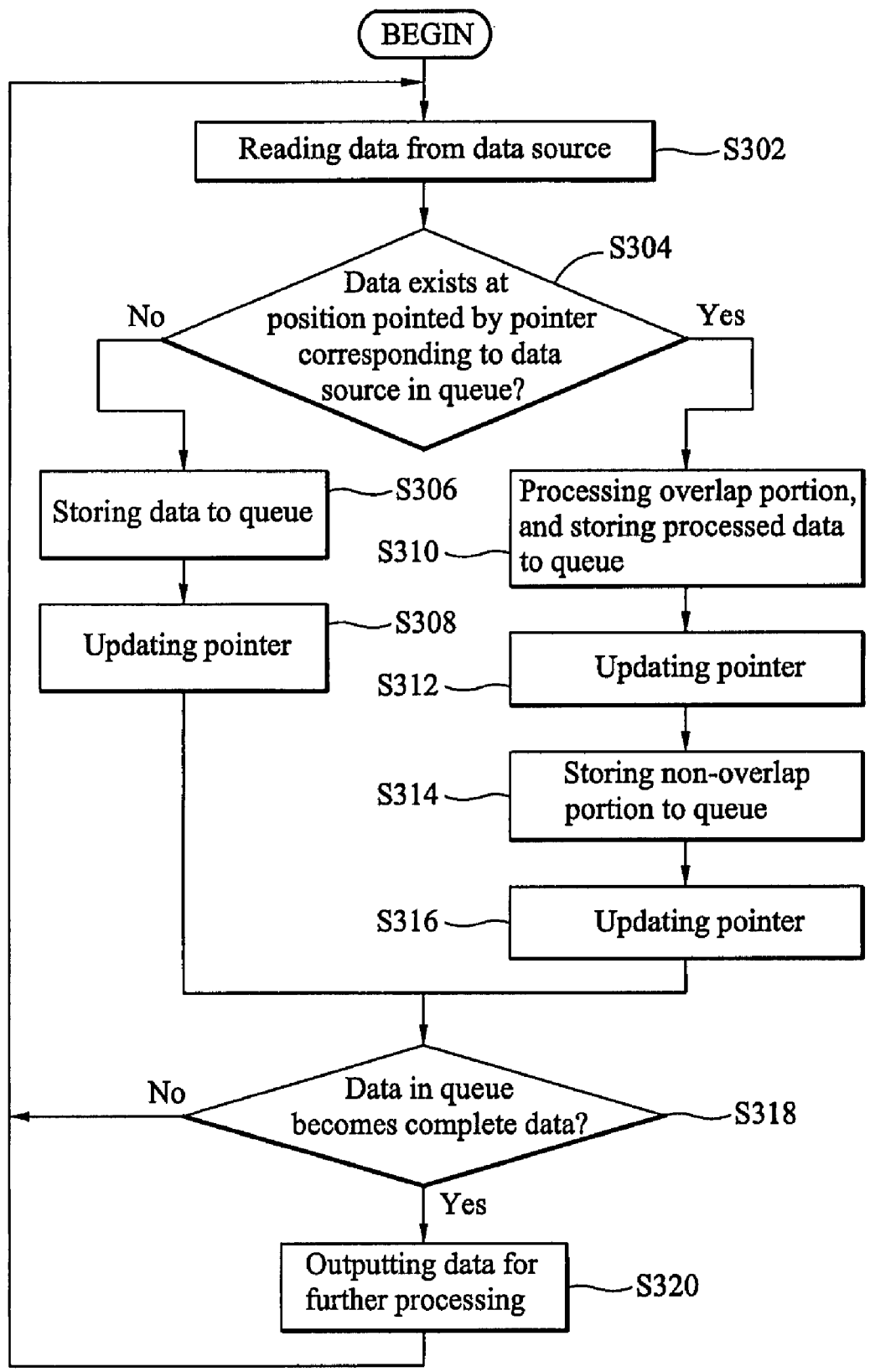
FIG. 3 is a flowchart of an embodiment of a method for processing multi-source data.

FIG. 3 is a flowchart of an embodiment of a method for processing multi-source data. In this embodiment, data from several data sources are read, and temporarily stored to a queue. If the data in the queue becomes complete data, the complete data is output for further processing.

In step S302, a data request is generated to read data from a data source. It is noted that if it is the first time to read data from a specific data source, the data requested to be read is from the starting address of the specific data source to an address boundary. Additionally, the size of data read from the data source at a time is greater than or equals the size of data block that can be processed by the data processing system at a time. Thereafter, in step S304, it is determined whether any data exists at a position pointed by a pointer corresponding to the data source in the queue. Each data source has a corresponding pointer pointing to a specific position in the queue, representing the data of the data source to be stored from the position in the queue. If no data exists at the position pointed by the pointer (No in step S304), the data is directly stored to the queue from the position pointed by the pointer as step S306, and the pointer re-points to a position subsequent to the data in the queue as step S308.

If there are data existing at the position pointed by the pointer (Yes in step S304), an overlapped portion of the data read from the data source and the data pointed by the pointer in the queue is processed, where the overlapped portion begins from the position pointed by the pointer and the processed data is stored to the queue from the position pointed by the pointer as step S310. In step S312, the pointer re-points to a position subsequent to the processed data in the queue. It is understood that the process performed with the data may comprise an arithmetic or logic process. In step S314, a non-overlapped portion of the data read from the data source and the data pointed by the pointer in the queue is stored to the queue from the position pointed by the pointer, and in step S316, the pointer re-points to a position subsequent to the non-overlapped portion in the queue. It is understood that data overlapped may be determined according to the pointers corresponding to respective data sources. Additionally, each pointer initially points to the top of the queue. If the pointer points to the bottom of the queue, the pointer will re-point to the top of the queue. In some embodiments, the position of the respective pointer can be calculated according to the physical memory address of the corresponding data source, and used to determine whether data processing is correct. Thereafter, in step S318, it is determined whether the data in the queue is complete data. If not, the procedure returns to step S302, data is further read from another data source. If so, in step S320, the complete data is output for further processing. Then, the procedure returns to step S302.

Figure 4:
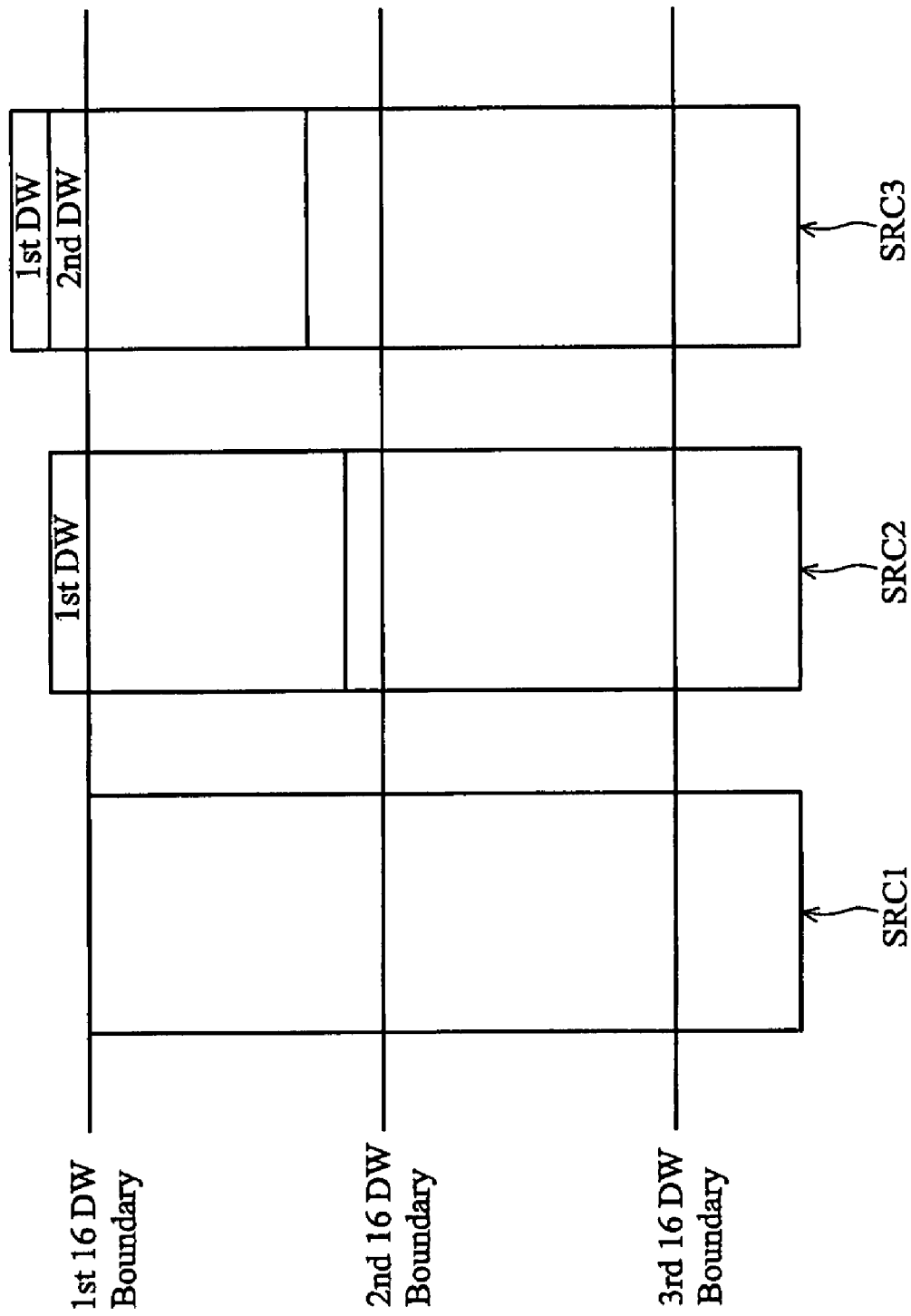
FIG. 4 shows an example with three data sources.

An example follows. FIG. 4 shows an example with three data sources. In this example, a data processing system can process a data block of 16 DWs at a time, and require addresses 16 DW aligned. The size of a queue is 32 DWs, twice as large as the data block to be processed by the data processing system at a time. The storage capacity of each memory address is one byte.

As shown in FIG. 4, the starting address of data source SRC1 is 16 DW aligned. The starting address of data source SRC2 is one DW (one double words is equal to 4 bytes) above the 16 DW boundaries (that is the last two code of the starting addresses of data blocks is at 0x3C, 0x7C, 0xBC or 0xFC). The starting address of data source SRC3 is two DWs above the 16 DW boundaries (that is the last two code of the starting addresses of data blocks is at 0x38, 0x78, 0xB8 or 0xFS). In the RAID 5 architecture, the data are separately kept in different storage devices. For example, SRC1 may be disk D1, SRC2 may be disk D2, and SRC3 may be disk D3. At the first data request for respective data source, the requested data is from the respective starting address to the second 16 DW boundary. That is, data of 16 DWs is requested from data source SRC1, data of 17 DWs is requested from data source SRC2, and data of 18 DWs is requested from data source SRC3. All data from SRC1, SRC 2, and SRC3 is performed with an arithmetic or logic process, and stored to the queue.

FIGS. 5A, 5B, 5C and 5D show the queue status for a data request cycle. The positions pointed by pointer P1, P2 and P3 respectively represent the position to be stored with subsequent data from respective data sources SRC1, SRC2 and SRC3. Initially, pointer P1, pointer P2 and pointer P3 point to the top of the queue 220.

Figure 5:
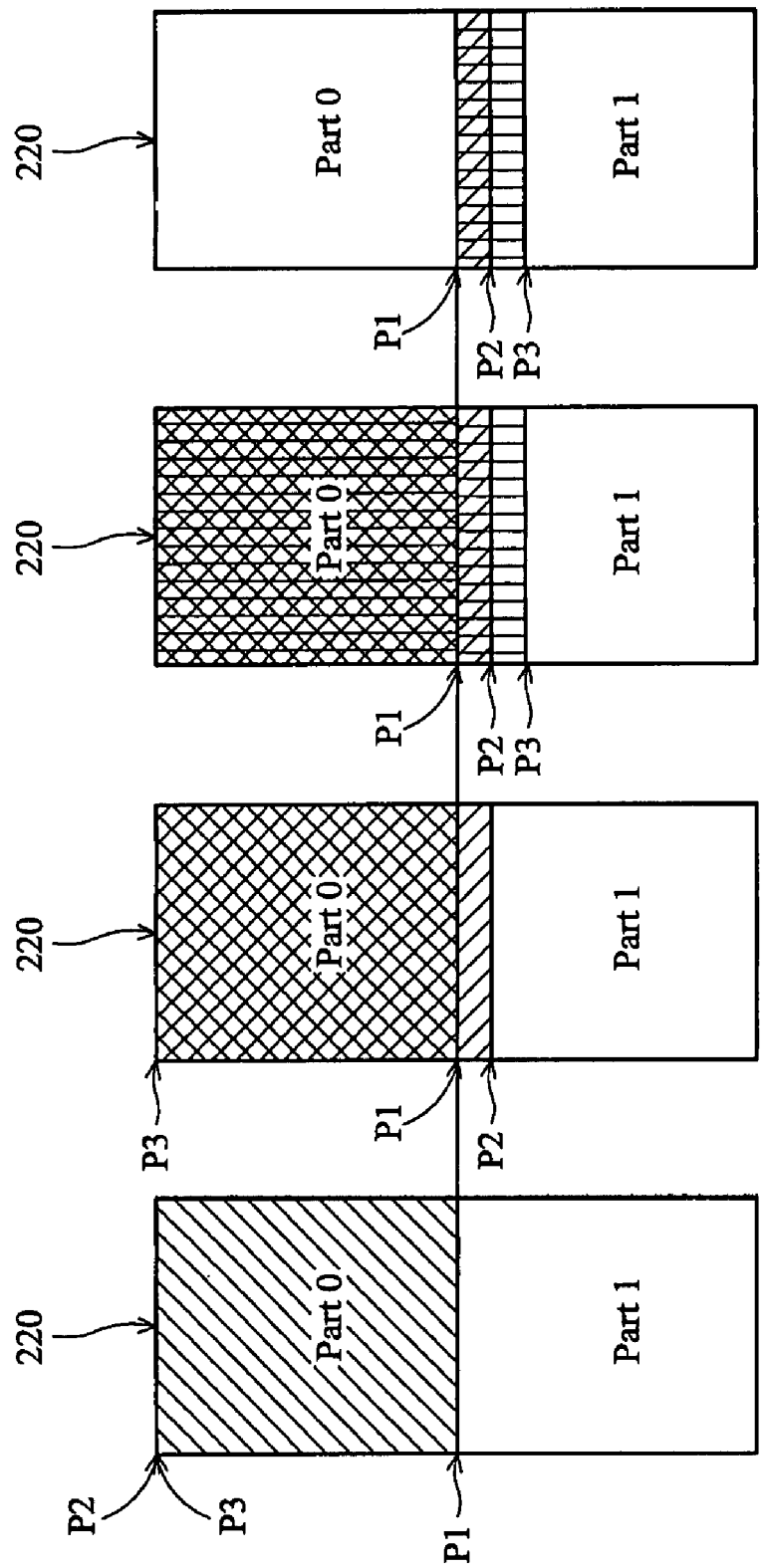
FIGS. 5A, 5B, 5C and 5D show the queue status for a data request cycle.

First, data is read from data source SRC1. Since no data is in the queue 220, the data is stored to the queue 220, and pointer P1 corresponding to data source SRC1 re-points to a position subsequent to the data read from the data source SRC1, as shown in FIG. 5A. Then, data is read from data source SRC2. Since the position pointed by pointer P2 exists the previous data read from the data source SRC1, it also means that a portion of data read from to data source SRC2 is overlapped with the data existing in the queue 220, the overlapped portion of the data read from data source SRC2 is processed according to a pre-determined algorithm and stored to the queue 220. The algorithm is defined by user to perform the specific logic or arithmetic operations. On the other hand, the non-overlapped portion of the data read from data source SRC2 is directly stored to the queue 220, and pointer P2 is updated, as shown in FIG. 5B. More particularly, the overlapped portion has a length of 16 DWs and the non-overlapped portion has a length of one DW. Thereafter, data is read from data source SRC3. Similarly, data exists at the position pointed by pointer P3, and the data read from data source SRC3 is overlapped with the data existing in the queue 220, an overlapped portion of the data read from data source SRC3 is processed according to the algorithm and stored to the queue 220. And, a non-overlapped portion of the data read from data source SRC3 is directly stored to the queue 220, and pointer P3 is updated, as shown in FIG. 5C. More particularly, the overlapped portion has a length of 17 DWs and the non-overlapped portion has a length of one DW. After a complete data request cycle (data has been requested once from respective data sources), Part 0 of the queue 220 is completely processed (final result of the algorithm), but Part 1 of the queue 220 is intermediate data not being completely processed. The first DW in Part 1 is the processed result of the data from data source SRC2 and SRC3. The second DW in Part 1 is the data from data source SRC3. Since Part 0 of the queue 220 is complete data, the data in Part 0 is output to a specific destination address for further processing. After the complete data is output, the space is cleared for storing subsequent data from the data sources, as shown in FIG. 5D.

Figure 7:
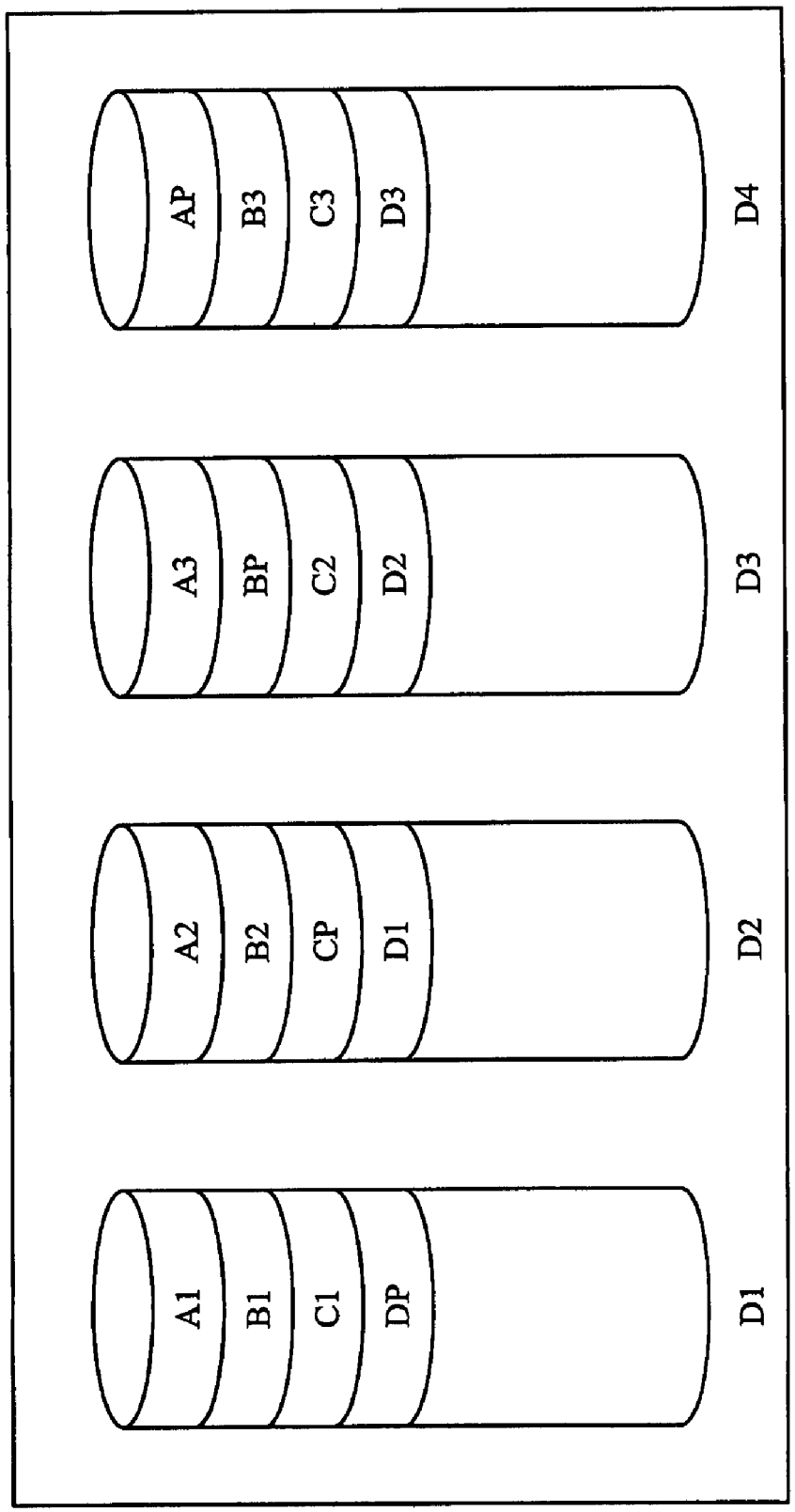
FIG. 7 is a schematic diagram illustrating a conventional RAID 5 architecture.

FIGS. 5A to 5D can be applied to the RAID architecture in FIG. 7, where data strips are respectively read from disks D1 to D3, and parity information is calculated according to the data strips from the disks. That is, parity information AP is the algorithmic result of data strips A1, A2 and A3 from disks D1, D2 and D3, respectively. It is noted that parity information AP can be stored to another data source SRC4 (not shown in FIG. 4), such as disk D4, or for other applications. It is understood that since the 17 DW data of the first request from data source SRC2 exceeds the size of data block (16 DW) that can be processed by the data processing system at a time, the 17 DW data from data source SRC2 is stored to the queue 220 at two times, where the first DW of data strip A2 is the first read, and the second DW to the 16th DW of data strip A2 and the first DW of data strip B2 is the following read. Similarly, since the 18 DW data of the first request from data source SRC3 exceeds the size of data block (16 DW) that can be processed by the data processing system at a time, the 18 DW data from data source SRC3 are stored to the queue 220 at two times, where the first DW and the second DW of data strip A3 is the first read, and the third DW to the 16th DW of data strip A3 and the first DW and the second DW of data strip BP is the following read.

Figure 6:
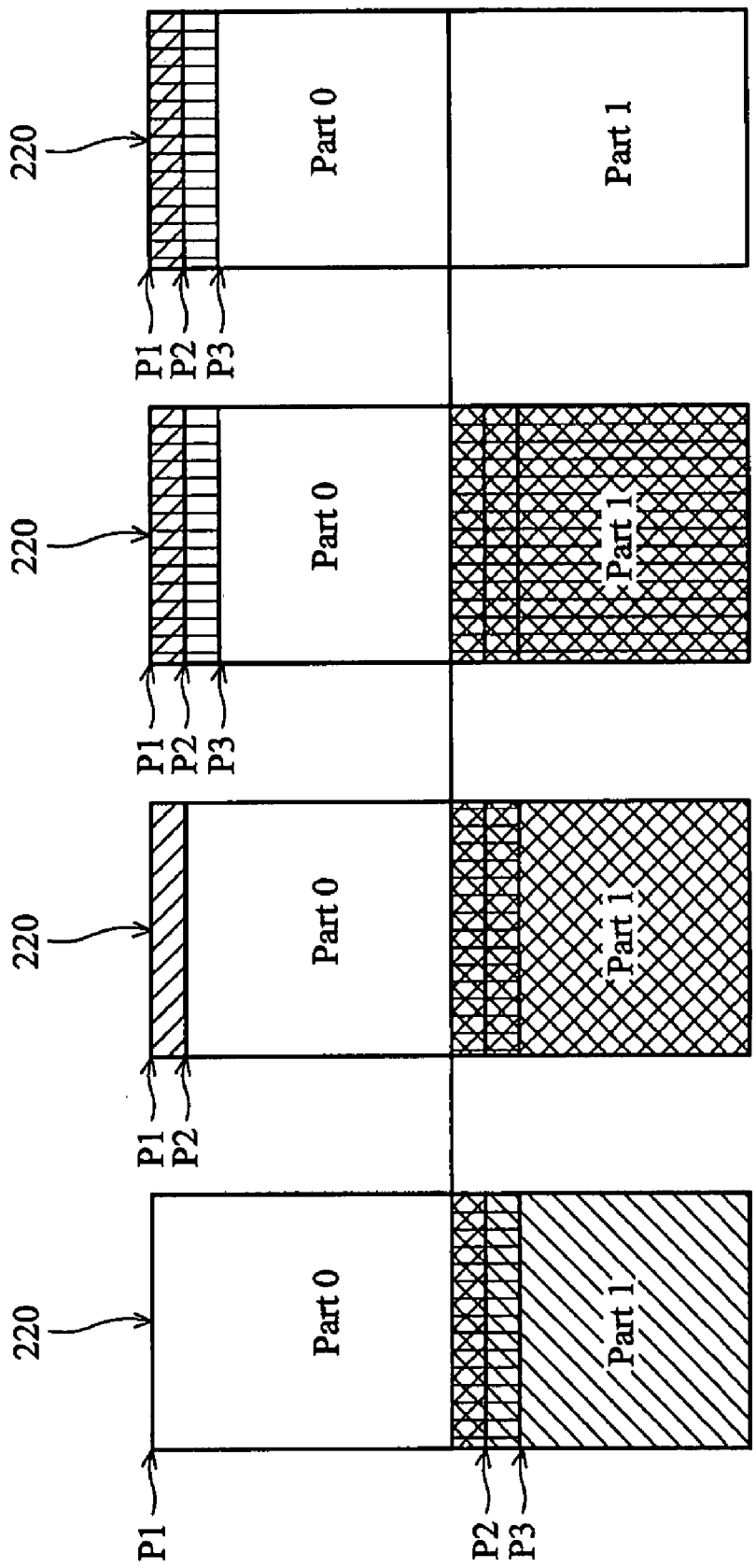
FIGS. 6A, 6B, 6C and 6D show the queue status for another data request cycle.

FIGS. 6A, 6B, 6C and 6D show the queue status for another data request cycle. First, data is read from data source SRC1 again. It is understood that, in this example, the size of the requested data equals that of data block that can be processed by the data processing system at a time. As shown in FIG. 6A, since data exist at the position pointed by pointer P1 in the queue 220, the overlapped portion of the data from data source SCR, ie. the first DW of the data from data source SRC1, and the data in the queue are processed and then stored to the queue 220. Since the first DW in Part 1 of the queue is the processed result of the data from data source SRC2 and SRC3, the processed first DW in Part 1 further using the data from data source SRC1 has become complete data. Additionally, the second DW of the data from data source SRC1 and the data in the queue is processed. Since the second DW in Part 1 of the queue is the data from data source SRC3, the second DW in Part 1 is the processed result of data sources SRC1 and SRC3. The rest of the data from data source SRC1 are directly stored in the Part 1 in the queue 220. Then, data is read from data source SRC2. The first DW of the data from data source SRC2 and the second DW in Part 1 of the queue is processed and then stored to the second DW in Part 1 of the queue. Since the second DW in Part 1 of the queue is the processed result of the data from data source SRC1 and SRC3, the processed second DW in Part 1 further using the data from data source SRC2 has become complete data. After the third DW in Part 1 of the queue, the data from data sources SRC1 and SRC2 is processed. Since no more space in Part 1 can be used for storing the last DW of the data read from data source SRC2, the last DW of the data read from data source SRC2 is stored to the first DW in Part 0 of the queue, as shown in FIG. 6B. Thereafter, data is read from data source SRC3. The data from data source SRC3 is processed with the data subsequent to the third DW in Part 1 of the queue and stored back to the corresponding positions in Part 1 of the queue. Since the data subsequent to the third DW in Part 1 of the queue is the processed result of the data from data source SRC1 and SRC2, the processed data subsequent to the third DW in Part 1 further using the data from data source SRC3 has become complete data. The data from data source SRC3 and the first DW in Part 0 of the queue is processed, and the last DW of the data read from data source SRC3 is stored to the second DW in Part 0 of the queue, as shown in FIG. 6C. At this time, the data in Part 0 of the queue has become complete data, and output to a destination address for further processing. After the complete data is output, the space is cleared for storing subsequent data from the data sources, as shown in FIG. 6D.

Similarly, FIGS. 6A to 6D can be also applied to the RAID architecture in FIG. 7, where data strips B1 and B2 and parity information BP are respectively read from disks D1 to D3, and data strip B3 is calculated according to data strips B1 and B2 and parity information BP. Data strip B3 can be stored to another data source SRC4 (not shown in FIG. 4), such as disk D4, or for other applications. It is understood that the procedure may be repeated until all required data is read from respective data sources.

Figure 8:
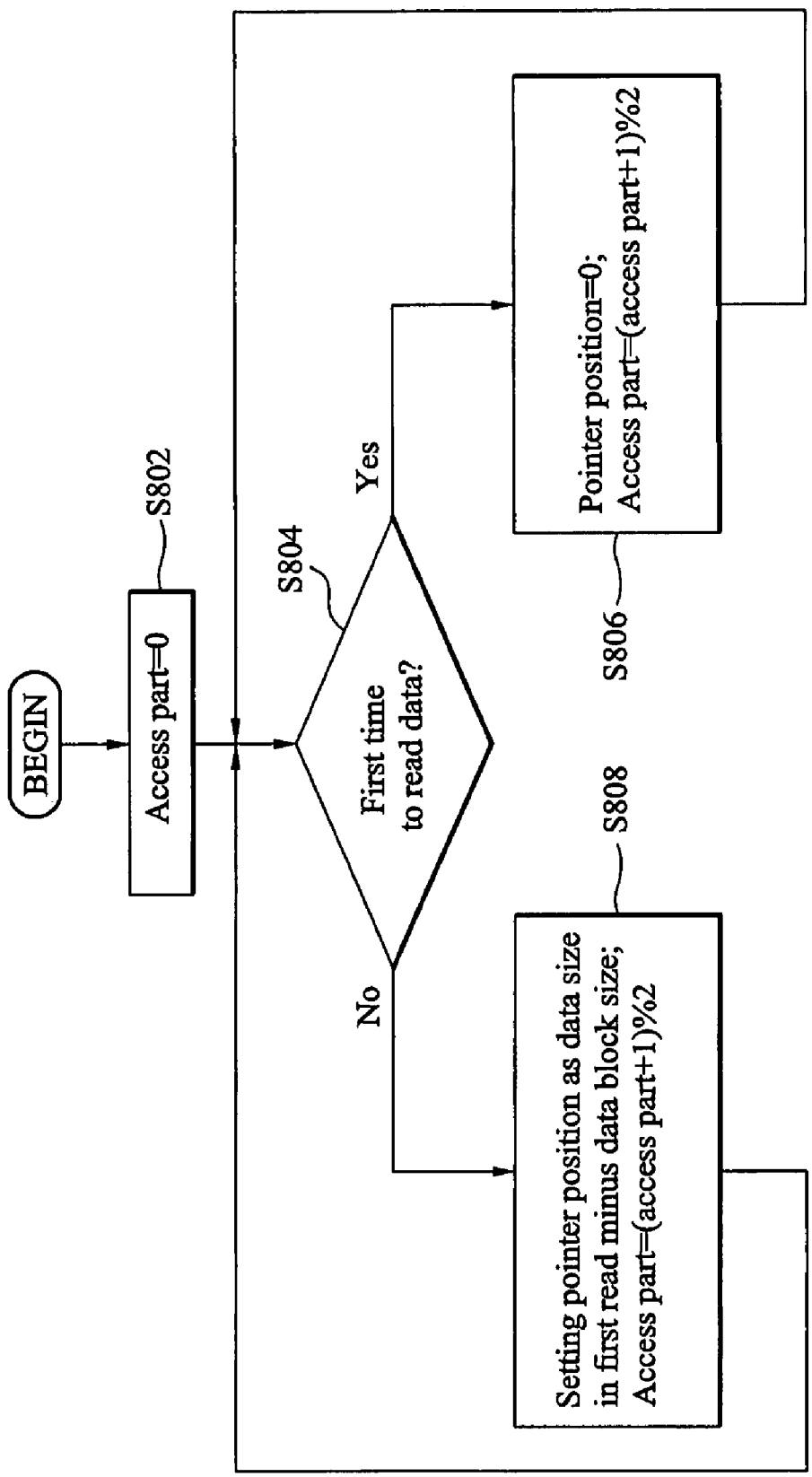
FIG. 8 is a flowchart of an embodiment of a method for determining the pointer position.

In addition to the above manner to determine the positions of respective pointers corresponding to respective data sources, the positions of respective pointers can be determined using various manners. FIG. 8 is a flowchart of an embodiment of a method for determining the pointer position. In this embodiment, the positions of respective pointers can be determined according to the data size in the first read from respective data sources. Further, the queue is divided into Part 0 and Part 1.

In step S802, an access part is initially set as 0. In step S804, it is determined whether data is the first time to be read from a data source. If so, executes step S806, i.e. a pointer corresponding to the data source points to 0, and execute modulo operation of the access part of the queue added by 1 and 2. In other words, the access part is added by 1, and then the access part is set as the remainder of the added access part divided by 2. That is if the data source is the first time to be requested or the queue is the first time to be accessed, the queue is accessed from position 0 in Part 0 (the starting address of Part 0). Then, the access part is added by 1 and is updated as the reminding of 1 divided by 2. If the data source is not the first time to be requested, executes step S808, i.e. the position of the pointer corresponding to the data source is set as the data size in the first read from the data source minus the size of a data block, then the access part of the queue is added by 1, and then the access part is set as the remainder of the added access part divided by 2. It is noted that data from a specific starting address to an address boundary is read if the data source is the first time to be requested. That is a position of the data size in the first read from the data source minus the size of a data block in Part 1 is to be accessed therefrom if the data source is the second time to be requested. In this embodiment, Part 0 and Part 1 of the queue are accessed alternately. Similarly, if data in the queue becomes complete data, the complete data is output for further processing.

Figure 9B:
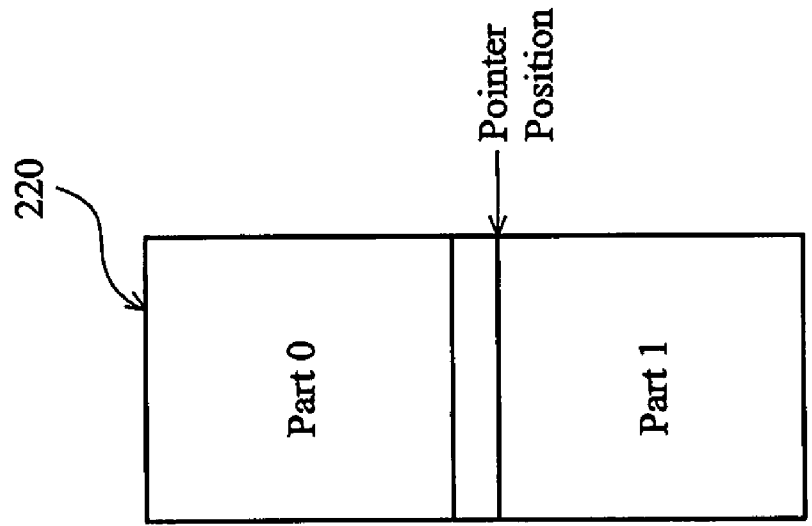
FIGS. 9A and 9B show examples of settings for pointer position during the first time and the second time of data reading from a data source.
Figure 9A:
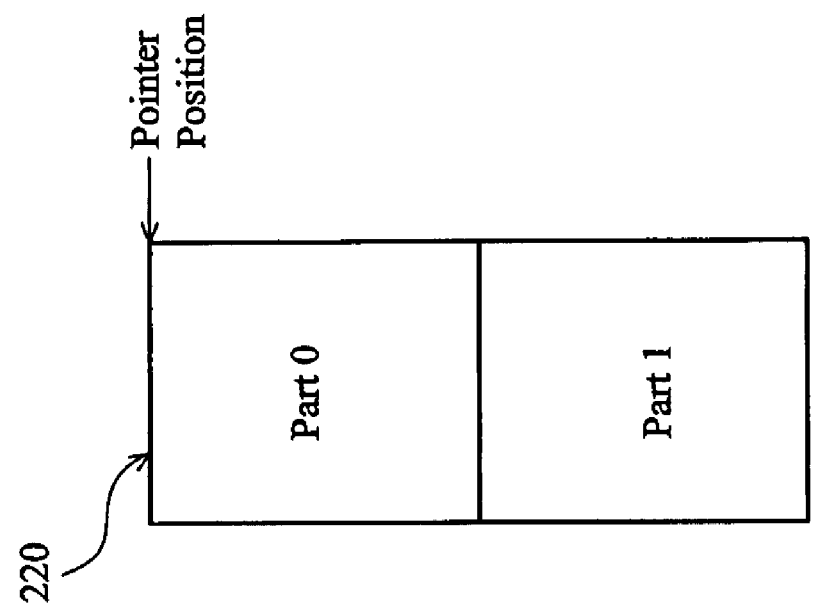

For example, the starting address of data source SRC2 is one DW above the 16 DW boundaries. At first, the access part of the queue 220 is Part 0, and the pointer corresponding to data source SRC2 points to position 0, as shown in FIG. 9A. The data in the first read from data source SRC2 is stored from position 0 in part 1 of the queue 220. If data source SRC2 is the second time to be requested, the access part of the queue 220 is added by 1, and then is set the access part as the reminding of the added access part divided by 2. Thereafter, the access part is Part 1. Since the data size of the first read is 17 DWs, the pointer corresponding to data source SRC2 points to position 1 (17 DWs-16 DWs), as shown in FIG. 9B. The data read from data source SRC2 is stored from position 1 in part 2 of the queue 220. The procedure is repeated.

According to the embodiments of methods for processing multi-source data, unnecessary data of one data request is not discarded, but stored in the queue, and subsequent data requests can be issued for data that has never been requested, thereby improving process efficiency of data processing systems and methods.

Methods for processing multi-source data, or certain aspects or portions thereof, may take the form of program code (i.e., executable instructions) embodied in tangible media, such as products, floppy diskettes, CD-ROMS, hard drives, or any other machine-readable storage medium, wherein, if the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, if the program code is received and loaded into and executed by a machine, such as a computer, the machine becomes an apparatus for practicing the disclosed methods. If implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for processing multi-source data for use in a data processing system receiving data from a plurality of data sources, comprising:
   reading data from a first data source;
   determining whether any data exists at a position pointed by a first pointer in a queue, wherein the first pointer corresponding to the first data source;
   performing a first operation if data exists at the position pointed by the first pointer in the queue, wherein the first operation comprising:
      processing an overlapped portion of the data read from the first data source and the data pointed by the first pointer in the queue, where the overlapped portion begins from the position pointed by the first pointer;
      storing the processed data to the queue from the position pointed by the first pointer;
      re-directing the first pointer to a position subsequent to the processed data in the queue;
      storing a non-overlapped portion of the data read from the first data source and the data pointed by the first pointer in the queue to the queue from the position pointed by the first pointer; and
      re-directing the first pointer to a position subsequent to the non-overlapped portion in the queue; and
   outputting the processed data to the data processing system for further processing if the data in the queue is processed with data from each of the data sources.

2. The method of claim 1 further comprising:
   performing a second operation if no data exists at the position pointed by the first pointer corresponding to the first data source in the queue, wherein the second operation comprising:
      storing the data read from the first data source to the queue from the position pointed by the first pointer; and
      re-directing the first pointer to a position subsequent to the data in the queue.

3. The method of claim 2 further comprising:
   reading data from a second data source;
   determining whether any data exists at a position pointed by a second pointer in a queue, where in the second point corresponding to the second data source;
   performing a third operation if the data corresponding to the first data source exists at the position pointed by the second pointer in the queue, wherein the third operation comprising:
      processing an overlapped portion of the data read from the second data source and the data corresponding to the first data source in the queue, where the overlapped portion begins from the position pointed by the second pointer;
      storing the processed data to the queue from the position pointed by the second pointer; and
      re-directing the second pointer to a position subsequent to the processed data in the queue.

4. The method of claim 3 further comprising:
   performing a fourth operation if the data corresponding to the first data source exists at the position pointed by the second pointer corresponding to the second data source in the queue, wherein the fourth operation comprising:
      storing a non-overlapped portion of the data read from the second data source and the data corresponding to the first data source in the queue to the queue from the position pointed by the second pointer; and
      re-directing the second pointer to a position subsequent to the non-overlapped portion in the queue.

5. The method of claim 3 wherein the data read from the second data source is from a second starting address to an address boundary of the second data source if the second data source is the first time to be requested.

6. The method of claim 5 wherein the size of data read from the second data source is greater than or equals a maximum size of a data block to be processed by the data processing system at a time.

7. The method of claim 1 wherein the data read from the first data source is from a first starting address to an address boundary of the first data source if the first data source is the first time to be requested.

8. The method of claim 7 wherein the size of data read from the first data source is greater than or equals a maximum size of a data block to be processed by the data processing system at a time.

9. The method of claim 1 wherein the size of the queue is twice as large as a maximum size of a data block to be processed by the data processing system at a time.

10. The method of claim 1 wherein the data is processed with an arithmetic or logic process.

11. The method of claim 1 further comprising the first pointer re-pointing to the top of the queue if the first pointer points to the bottom of the queue.

12. A method for processing multi-source data for use in a data processing system receiving data from a plurality of data sources, comprising:
   reading data from respective data sources;
   determining whether the data is the first time to be read from each data source;
   if so, a pointer corresponding to each data source, pointing to a starting address of a first part in a queue;
   if not, the pointer corresponding to each data source, pointing to a position of a specific part in the queue according to the size of the data from each data source;
   storing the data from respective data source to the queue according to the position pointed by respective pointer; and
   processing the data from respective data sources in the queue, and outputting the processed data to the data processing system for further processing;
   reading data from respective data sources again;
   the pointer corresponding to each data source pointing to the position of the specific part in the queue according to the size of the data read from each data source at the first time, where the specific part is alternately set to the first part and a second part;

storing the data from respective data source to the queue according to the position pointed by respective pointer; and processing the data from respective data sources in the queue, and outputting the processed data to the data processing system for further processing.

13. The method of claim 12 wherein the data read from the data source is from a starting address to an address boundary of the data source if the data source is the first time to be requested.

14. The method of claim 13 wherein the size of data read from the data source is greater than or equals a maximum size of a data block to be processed by the data processing system at a time.

15. The method of claim 12 wherein the size of the queue is twice as large as a maximum size of a data block to be processed by the data processing system at a time.

16. The method of claim 12 wherein the data is processed with an arithmetic or logic process.

* * * * *